United States Patent [19]

Yoshida

[11] 4,262,323
[45] Apr. 14, 1981

[54] GAS INSULATED ELECTRICAL APPARATUS

[75] Inventor: Taminori Yoshida, Yokohama, Japan

[73] Assignee: Tokyo Shibaura Denki Kabushiki Kaisha, Japan

[21] Appl. No.: 12,013

[22] Filed: Feb. 14, 1979

[30] Foreign Application Priority Data

Feb. 17, 1978 [JP] Japan .................................. 53/16414

[51] Int. Cl.² .............................................. H02B 9/00
[52] U.S. Cl. .................... 361/333; 361/341; 361/376
[58] Field of Search ............... 361/331, 332, 333, 335, 361/341, 376, 429

[56] References Cited

U.S. PATENT DOCUMENTS

| 3,697,819 | 10/1972 | Eichelberger | 361/333 |
| 3,823,346 | 7/1974 | Olsen | 361/341 |
| 3,891,862 | 6/1975 | Clark | 361/333 |

*Primary Examiner*—Gerald P. Tolin
*Attorney, Agent, or Firm*—Stevens, Davis, Miller & Mosher

[57] ABSTRACT

An electrical apparatus including a gas insulated bus bar and a switch, and associated with a plurality of circuit lines, the apparatus having a plurality of bases, each provided for each of the line circuit breakers for mounting the breakers, the line disconnecting switch, the grounding device and the cable head to form a detachable unit.

1 Claim, 10 Drawing Figures

GAS INSULATED ELECTRICAL APPARATUS

BACKGROUND OF THE INVENTION

The present invention relates to an electric apparatus including a gas insulated bus bar and a switch.

A conventional arrangement including gas insulated bus bars and switches is as shown in FIGS. 1 and 2. Denoted by numeral 1 are main bus bars, each including a plurality of bus bar units 2 interconnected by connecting bus bars 3.

Denoted by numeral 4 are line circuit breakers connected to the respective ones of the bus bar units 2 of the main bus bar 1.

Each of the line circuit breakers 4 includes a bus bar disconnecting switch 5, a circuit breaker 6, a line disconnecting switch 7, a grounding device 8 and a cable head 9, which are, together with one of the bus bar units 2, mounted on a base 10 to form a unit corresponding to each line. Each unit including the line circuit breaker 4, the bus bar units 2 and the base is assembled and tested in the factory, and thereafter installed in the designated site. The line circuit breakers 4 are installed in the order of from one end to the other, or from the center towards both sides. Installation must be so made that the bus bar unit 2 of every unit is in alignment with the axis of the main bus bar 1.

Generally, interconnection between the bus bar units of the main bus bar is achieved by tulip contacts and therefore stringent dimensional accuracy is required in the position alignment. Moreover, since the unit including the line circuit breaker 4 is heavy, it must be installed by means of a crane. During the installation, position alignment of the connecting portions is made and also the conductors are moved in a horizontal direction against the contact pressure to achieve engagement. Such operations need to be simultaneously carried out while the line circuit breaker is suspended by a crane and are therefore associated with difficulties and hence require time and labor. Also, to conduct periodical tests during the use of the line circuit breakers for inspecting the bus bar disconnecting switch 5, the circuit breaker 6 has to be separated from the rest of the entire system. Furthermore, to check a bus bar disconnecting switch 5 in the middle of the main bus bar 1, it is necessary to remove the circuit breakers 6 and the bus bar disconnecting switches 5 of all the line circuit breakers situated between the particular bus bar disconnecting switch and either end of the bus bar. Thus, a great amount of work is involved and power transmission is interrupted over a long time.

SUMMARY OF THE INVENTION

An object of the present invention is to eliminate difficulties associated with the installation and the periodical inspection of an electrical apparatus including a gas insulated bus bar and a switch.

According to this invention there is provided an electrical apparatus of the type including a gas insulated bus bar apparatus a switch and associated with a plurality of circuit lines, the electrical apparatus having: a bus bar including a plurality of bus bar units disposed on a floor in alignment with each other and corresponding in number to the lines, each bus bar unit including a case, a bus bar conductor, and a bus bar disconnecting switch housed in the case, branched out of the bus bar conductor and having a terminal at the top of the case, and a plurality of line circuit breakers each corresponding to each of the bus bar units and to each of the lines, each line circuit breaker having a bus bar connection terminal and a line connection terminal, a line disconnecting switch, a grounding device connected through the line disconnecting switch to the line connection terminal of the circuit breaker, and a cable head connected to the grounding device, characterized by comprising: a plurality of bases, each provided for a respective one the line circuit breakers for mounting the circuit breaker, the line disconnecting switch, the grounding device and the cable head, to form a unit detachable from the rest of the electric apparatus and independently transportable, and a plurality of coupling bus bars, each mounted on each of the bases and mounted on the bus bar connection terminal of the circuit breaker and detachably connected to the terminal of the bus bar disconnecting switch, each coupling bus bar being detachable and connectible by vertical movement of the associated one of the line circuit breakers relative to the corresponding bus bar unit.

DESCRIPTION OF THE EMBODIMENTS

Figure 1:
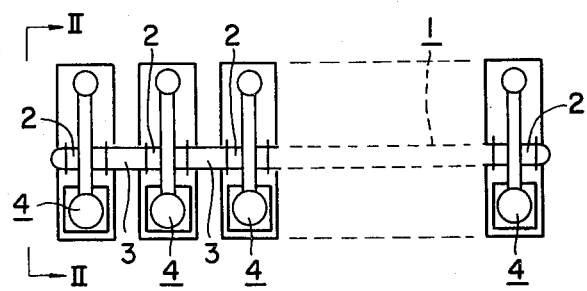
FIG. 1 shows a top view of a conventional arrangement of gas insulated bus bars and switches.
Figure 2:
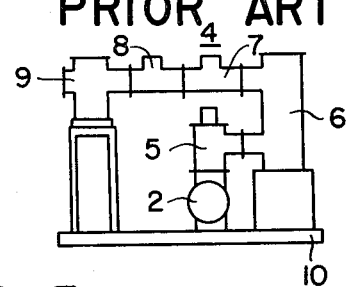
FIG. 2 shows a sectional view taken along the line II—II in FIG. 1.
Figure 3:
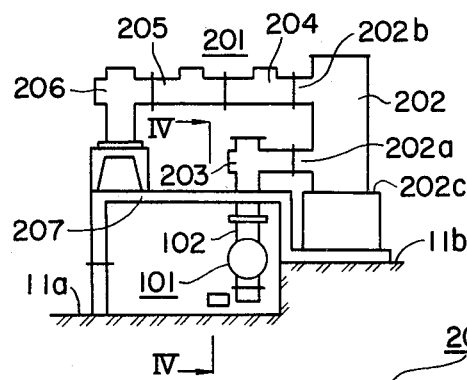
FIG. 3 shows a side view of an embodiment of the invention.
Figure 4:
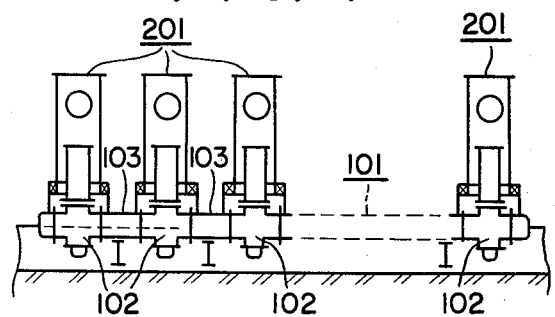
FIG. 4 shows a sectional view taken along the line IV—IV in FIG. 3.
Figure 5:
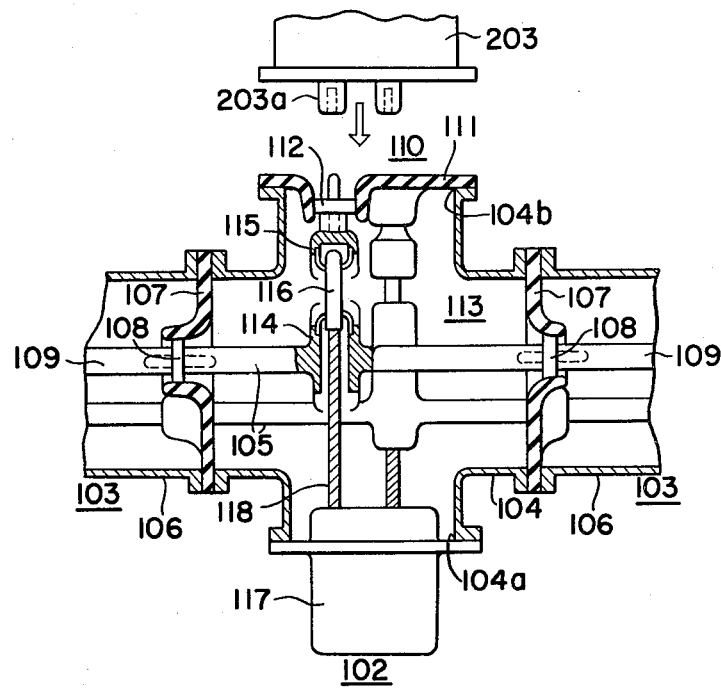
FIG. 5 shows a sectional view of a bus bar unit embodying the invention.

Referring now more particularly to FIGS. 3 through 5, there is shown an embodiment of the invention. Denoted by numeral 101 is a main bus bar provided at the lower portion 11a of a stepped floor surface. The main bus bar 101 comprises a plurality of bus bar units 102 axially aligned with each other, and corresponding in number to the input and output circuits, and connecting bus bars 103 interconnecting the bus bar units 102. Each of the bus bar units 102 includes a case 104 housing bus bar conductors 105 (for three phases). The case 104 is removably coupled through an insulating spacer 107 to a case 106 of a connecting bus bar 103. Each bus bar conductor 105 is detachably connected to a respective one of bus bar conductors 109 of the connecting bus bar 103 via a connecting member 108 air-tightly penetrating the insulating spacer 107. Each bus bar conductor 105 is detachable from the associated bus bar conductor 109 by moving it in the horizontal direction. Each bus bar unit 102 is provided with a bus bar disconnecting switch 113 branched out of the bus bar conductor 105. The bus bar disconnecting switch 113 is oriented vertically and disposed inside of the case of the bus bar unit 102, and has a terminal 110 provided on the top of the case. Each bus bar disconnecting switch 113 comprises a first stationary contact 114 formed integrally with the bus bar conductor 105, a second stationary contact 115 disposed opposite the first contact 114 and a movable contact 116 extending through an opening of the first stationary contact 114 in slidable engagement therewith to engage and disengage to and from the second stationary contact 115 while being kept in contact with the first stationary contact 114. The movable contact 116 is driven through an insulating rod 118 by an operating device 117 mounted to the edge 104a of a lower opening of the case 104. The second stationary contact 115 is fixed to a connecting member 112 provided in an insulating spacer 111, the connecting member 112 forming a terminal provided at the edge 104b of the upper opening.

Denoted by numeral 201 are line circuit breakers, each of which is assembled to form a unit corresponding to each of the lines and can be transported as assembled. The line circuit breakers 201 are respectively connected to the respective ones of the bus bar units 102. Each line circuit breaker 201 comprises a circuit breaker 202 operated by an operating device 202c, a L-shaped coupling bus bar 203 mounted on a bus bar connection terminal 202a and connected to the terminal 110 of a bus bar unit 102, a grounding device 205 connected to the line terminal 202b of the circuit breaker through a straight line disconnecting switch 204, a cable head 206, and other constituent members. These members are assembled together on a common base 207 to form a unit transportable as a whole.

Figure 6:
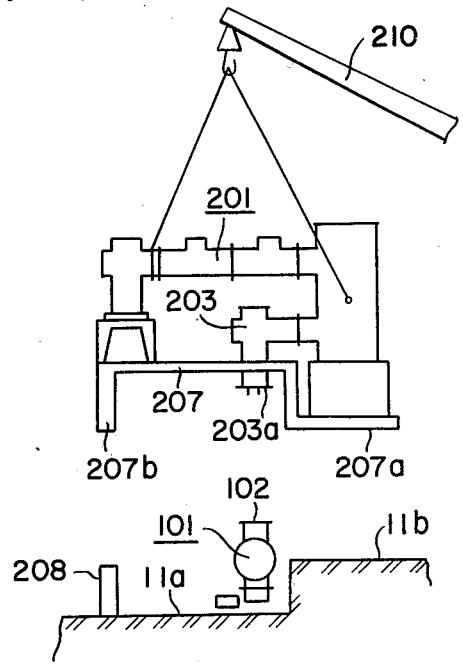
FIG. 6 shows a schematic view illustrating a manner of installation.

For installation, as shown in FIG. 6, each breaker 201 is lifted by a crane 210 and then lowered such that one end 207a of the base 207 on which the breaker 202 is mounted lands on the upper portion 11b of the floor surface situated on one side of the bus bar, and that the opposite end 207b of the base 207 is fixed to a support 208 mounted on the lower portion 11a of the floor surface, on the opposite side of the bus bar. As the line circuit breaker 201 is lowered, a tulip contact 203a protruding from the bottom of the coupling bus bar 203 is slid into engagement with the connecting member 112 provided on the terminal 110 of the bus bar disconnecting switch 113. The end surface of the case of the coupling bus bar 203 is joined through an insulating spacer 111 to the end surface of a flange portion of the terminal 110.

Since the coupling bus bar of the line circuit breaker is lowered, from above, towards the terminal of the corresponding bus bar disconnecting switch 113, with the position having been already determined, engagement between the conductors of the connecting parts is readily achieved and difficulties which are associated with position alignment in the conventional system are eliminated, with the result that time and labor necessary for the installation are reduced.

During the testing of the bus bar disconnecting switch, it is only necessary to disconnect the coupling bus bar of the line circuit breaker from the terminal of the bus bar unit and to lift the breaker as assembled, and then to remove the insulating spacer of the terminal of the bus bar unit. Then, one can easily test the bus bar disconnecting switch and the bus bar.

It will be appreciated that it is no longer necessary to detach the circuit breaker from the rest of the devices, or to remove all the breakers situated between the particular line circuit breakers to be tested and one end of the bus bar.

Thus, time and labor necessary for the installation and the test during use are substantially reduced.

Figure 7:
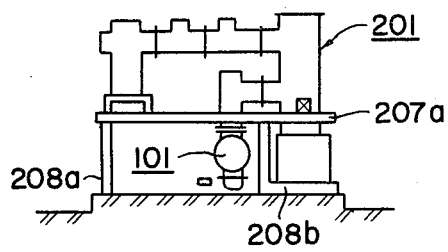
FIG. 7 shows a side view of another embodiment of the invention.
Figure 8:
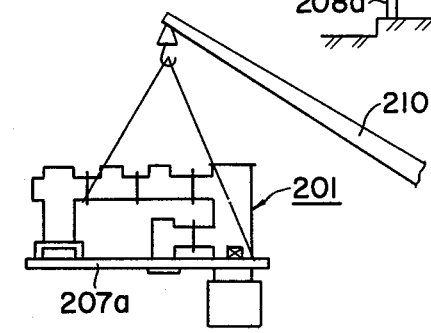
FIG. 8 shows a schematic view illustrating a manner of installation of the apparatus of FIG. 7.

FIGS. 7 and 8 show another embodiment of the invention with a variation of a base on which the circuit breaker 201 and other constituent members of the line circuit breaker 201 are mounted. The base illustrated in FIGS. 7 and 8 comprises a frame 207a which can be detachably mounted on support members 208a and 208b. The frame 207a is used as a suspension beam when the breaker 201 is lifted.

Figure 9:
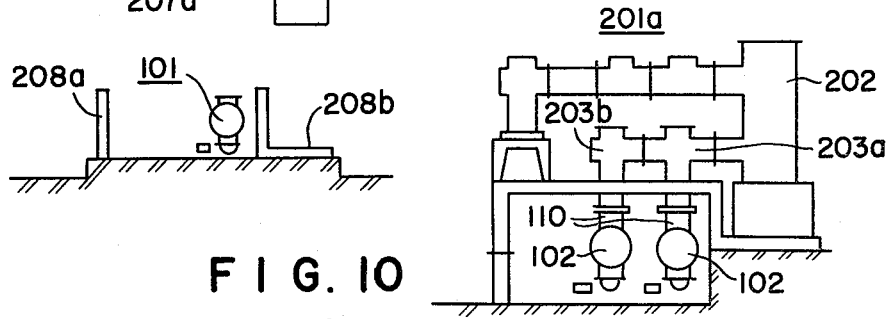
FIG. 9 shows a side view of still another embodiment of the invention.
Figure 10:
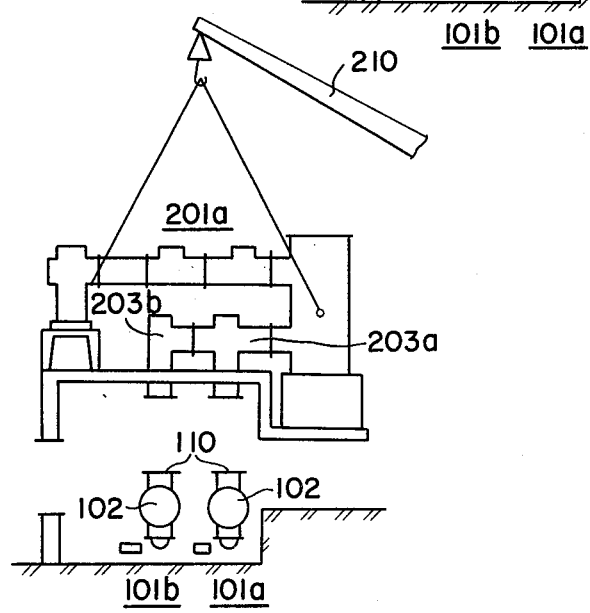
FIG. 10 shows a schematic view illustrating a manner of installation of the apparatus of FIG. 9.

FIGS. 9 and 10 show still another embodiment of the invention constructed to form a dual bus bar system. Main bus bars 101a and 101b are provided in parallel with each other and includes bus bar units 102 each housing a bus bar disconnecting switch. Connected to the terminal 110 of the bus bar disconnecting switch in the bus bar unit of the bus bar 101a is a substantially T-shaped coupling bus bar 203a. Similarly, connected to the terminal 110 of the bus bar disconnecting switch in the bus bar unit of the bus bar 101b is a substantially L-shaped coupling bus bar 203b. The apparatus shown in FIGS. 9 and 10 has an additional advantage in that the bus bar disconnecting switches associated with one of the main bus bars can be tested while the other main bus bar is maintained alive.

What is claimed is:

1. In an electrical apparatus of the type including a gas insulated bus bar and a switch apparatus associated with a plurality of circuit lines, said electrical apparatus having:

a bus bar including a plurality of bus bar units disposed on a floor in alignment with each other and corresponding in number to the circuit lines, each bus bar unit including a case, a bus bar conductor, and a bus bar disconnecting switch housed in said case and branched out of said bus bar conductor and having a terminal at the top of said case, and a plurality of line circuit breakers each corresponding to each of said bus bar units and to each of the circuit lines, each line circuit breaker having a bus bar connection terminal, a line connection terminal, a line disconnecting switch, a grounding device connected through said line disconnecting switch to said line connection terminal of said circuit breaker, and a cable head connected to said grounding device, the improvement which comprises:

a plurality of bases, each provided for a respective one of said line circuit breakers for mounting said circuit breaker, said line disconnecting switch, said grounding device and said cable head of said respective one of said line circuit breakers, to form respective units detachable from the rest of said electric apparatus and independently transportable, and a plurality of coupling bus bars, each mounted on each of said bases and mounted on said bus bar connection terminal of said circuit breakers and detachably connected to said terminals of said bus bar disconnecting switches, each coupling bus bar being detachable and connectible by vertical movement of the associated one of said line circuit breakers relative to the corresponding bus bar unit.

* * * * *